Sept. 19, 1944. R. G. THOMPSON 2,358,482
GENERATOR REGULATOR
Filed Nov. 29, 1941 3 Sheets-Sheet 2

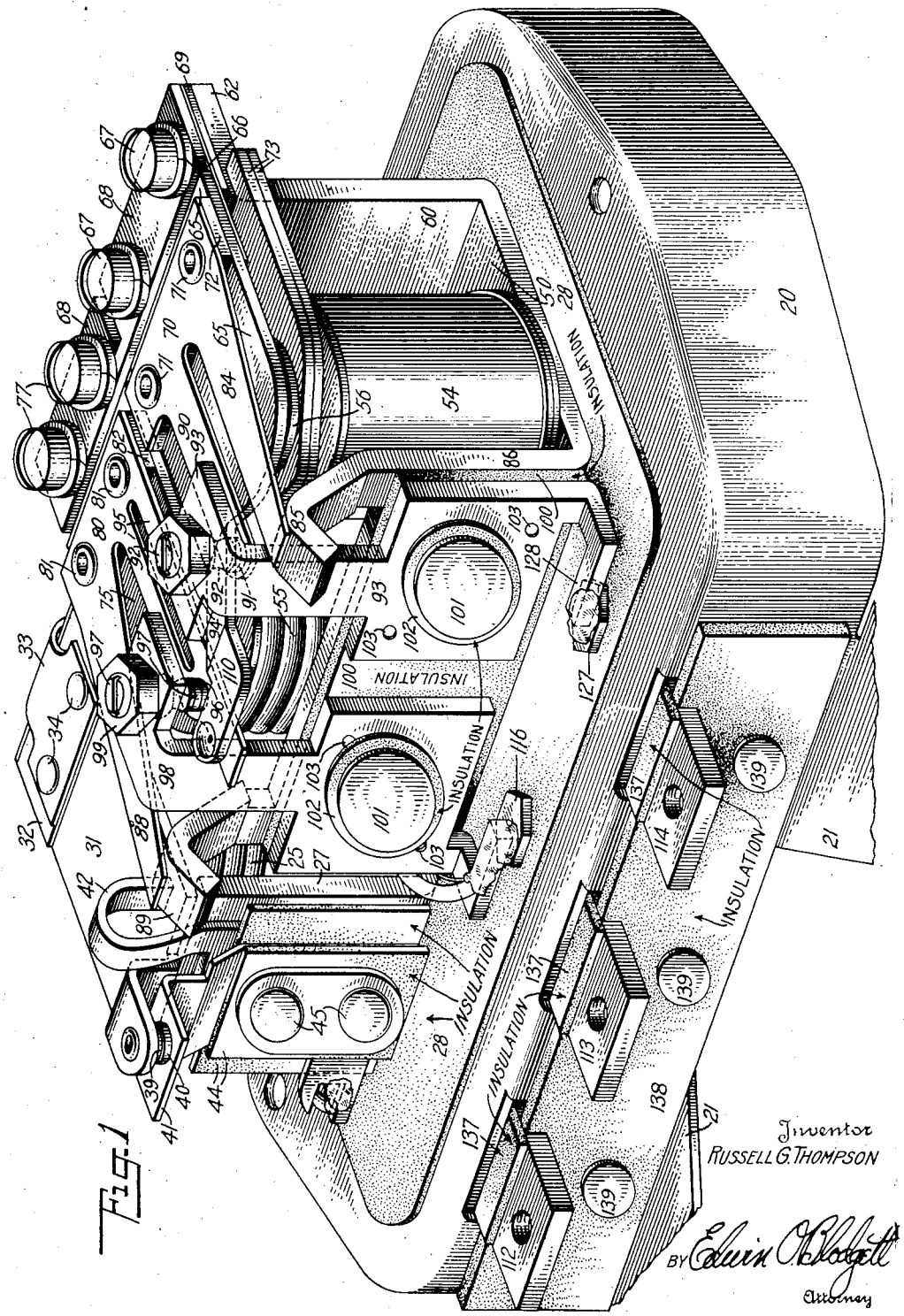

Inventor
RUSSELL G. THOMPSON
BY Edwin O. Blodgett
Attorney

Inventor
RUSSELL G. THOMPSON
By Edwin O. Blodgett
Attorney

Patented Sept. 19, 1944

2,358,482

UNITED STATES PATENT OFFICE 2,358,482

GENERATOR REGULATOR

Russell G. Thompson, Elmira, N. Y.

Application November 29, 1941, Serial No. 421,083

3 Claims. (Cl. 200—98)

This invention relates to generator regulating systems, and more particularly to improved regulating apparatus and systems for use with variable speed generators.

The generators used on motor vehicles such as automobiles, airplanes, trucks, buses and the like are usually of the shunt field type driven by the vehicle propelling motor, and accordingly the generator is operated throughout a wide range of speed. In order to provide substantially constant voltage and to prevent overload, a regulating system is usually employed which consists of voltage responsive device and a separate current responsive device. These devices operate contacts to control the resistance in the generator field circuit in accordance with the generator speed and the load requirements. The contacts operated by these electromagnetic devices carry a substantial amount of current in the usual regulating system, and as these contacts have a vibrating operation at high generator speeds, it has been found that the effective life of these contacts is comparatively short and their adjustment is very critical and hard to maintain. The adjustment of the magnetic devices employed to operate these contacts is extremely critical and it is very difficult to obtain the accuracy of adjustment required to properly respond to definite values of voltage and current, and even when the required accuracy of adjustment is obtained, it often changes due to the adverse conditions to which the apparatus is subjected during operation of the motor vehicle. For these and other reasons, the regulating systems now most generally used on motor vehicles often fail to properly regulate the generator voltage and current thereby causing serious and expensive damage to the electrical equipment of the vehicle.

In view of the above and other considerations, it is proposed in accordance with the present invention to provide an improved regulating system and apparatus wherein the load carried by the field current controlling contacts is reduced to a value affording long and reliable contact operation, and wherein the electromagnetic devices operating these contacts are of rugged and simple construction permitting more convenient inspection and accurate adjustment and which are arranged to maintain such adjustment irrespective of adverse conditions to which the apparatus may be subjected. It is further proposed to provide such regulating apparatus wherein the number of parts is reduced to a minimum and with a minimum number of parts which are electrically insulated in order to provide a system and apparatus which may be easily and inexpensively manufactured and yet which will be thoroughly efficient and reliable in operation.

Other objects, purposes and characteristic features of the present invention will appear as the description thereof progresses, during which references will be made to the accompanying drawings, in which:

Fig. 1 is an enlarged perspective view showing one form of regulating apparatus arranged in accordance with the present invention.

Figure 4:
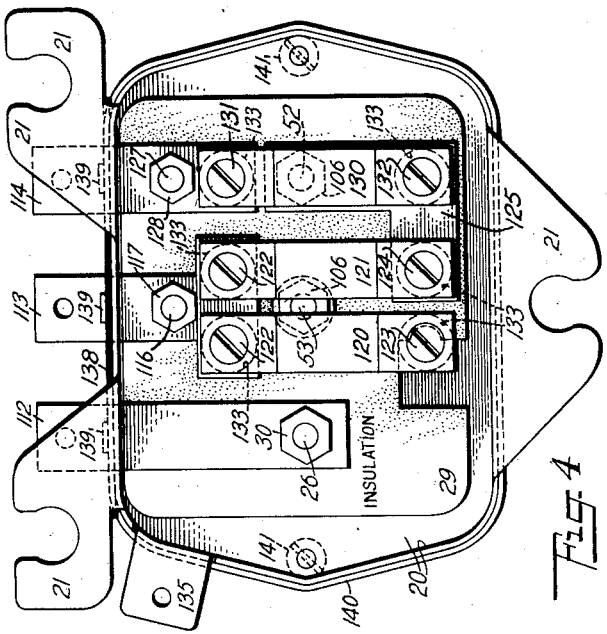
Fig. 4 is a bottom plan view of the assembled apparatus.

The regulating apparatus and system shown in the accompanying drawings may be used in connection with various types of generators, but is more particularly adapted for use with generators of the type employed on automobiles, airplanes, trucks, buses and the like for charging storage batteries and for supplying power for operating lights, fans, radios, air-conditioning apparatus and other electrical equipment which may be used on the vehicles. A generator of this type is shown diagrammatically in Figs. 6 and 8 as comprising an armature 10 and field windings 11, and a generator which may be of higher capacity is indicated in Fig. 7 as comprising an armature 12 having two parallel field windings 13 and 14.

These motor vehicle generators are usually of the shunt field type and are necessarily operated throughout a wide range of speed. Accordingly, a device for controlling the generator field excitation in accordance with the generator voltage and a separate device for also controlling the generator field excitation in accordance with the generator output current are required in order to maintain substantially constant voltage and to prevent overload of the generator at high speed. In the usual generator regulating system, these voltage and current responsive devices are individual and separate units or relays which operate individual contacts controlling the amount of resistance in the generator field circuit.

In accordance with the present invention, a single unit is provided which responds both to the generator voltage as well as to the output current of the generator with an arrangement of contacts operated in different combinations to regulate the generator field excitation in accordance with the generator speed and the load requirement. The form of this regulating apparatus shown in Figs. 1 to 5 inclusive comprises a sheet-metal base member 20 having a flat top with down-turned flanges around its edges forming a rigid supporting structure. The base 20 may be provided with integral brackets or lugs 21 for mounting the base and parts assembled thereon at a suitable place on the vehicle. The apparatus mounted on the base 20 includes a cut-out or reverse-current relay and a single unitary structure arranged in accordance with the present invention to take the place of the usual voltage responsive relay and a separate current responsive relay.

The present invention is not particularly concerned with the details of construction of the reverse-current relay, and other well known constructions may be used in place of the form illustrated. The construction illustrated in Figs. 1, 2 and 3 may be generally described as comprising an electromagnet having two windings, one winding 25 being of comparatively large size wire and the other winding (not shown) being of comparatively small size wire. Both of these windings are wound around a central core 26, the reduced diameter lower end of which is shown in Fig. 4. A U-shaped yoke 27 of magnetic material is provided with an opening in its base portion receiving the reduced diameter end of core 26 of the electromagnet, and this end portion of the core passes through openings in insulating strips 28 and 29 arranged above and below base 20. The lower end of core 26 of the electromagnet is threaded to receive a nut 30 whereby the reverse current relay assembly is securely clamped on base 20, and base 20 is provided with an enlarged opening the walls of which are spaced from the downwardly extending end of core 26 so that there is no electrical connection between the base and the parts of the reverse-current relay.

An armature 31 extending between the upper ends of yoke 27 is movably mounted by a resilient metal strip 32, and the armature is normally held upward away from the upper end of core 26 of the electromagnet by a spring strip 33 secured to armature 31 by rivets 34 which also serve to connect the resilient strip 32 to armature 31. Both the strip 32 and the spring strip 33 are bent downwardly over the edge of armature 31, and the lower end of spring strip 33 engages a bracket 35 which is mounted by screws 36 on the upper end of yoke 27, and screws 36 also serve to secure the resilient strip 32 to yoke 27.

The offset free end of armature 31 is provided with a low resistance contact 39 which is normally positioned above and out of engagement with a similar low resistance contact 40 carried by a stationary bracket 41. The normal position of armature 31 is determined by a bendable curved strip 42 secured to yoke 27 to engage the upper surface of the armature. The stationary contact bracket 41 is secured to but insulated from the yoke 27 by insulating strips 44 and by rivets 45 having their stem portions suitably insulated from bracket 41, and these rivets also serve to secure the armature stop strip 42 to yoke 27. The reverse-current relay operates in the usual manner to attract armature 31 downwardly toward the upper end of core 26 when battery charging current above a predetermined value flows in the windings of its electromagnet to engage contacts 39—40 against the force of spring 33, and at other times these contacts are open to prevent current from flowing from the battery through the generator armature.

Figure 5:
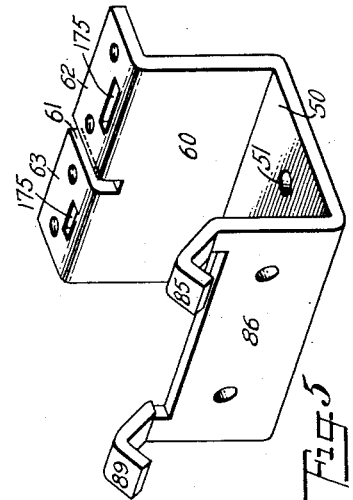
Fig. 5 is a perspective view of the magnetic yoke construction employed in the apparatus shown in Fig. 1.
Figure 2:
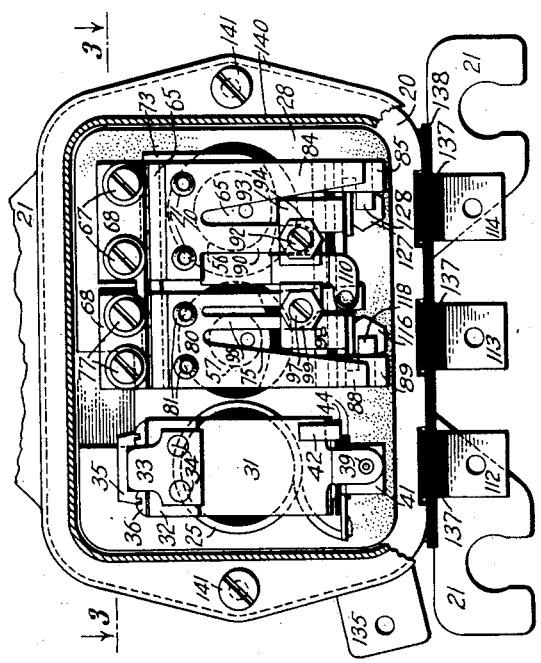
Fig. 2 is a top plan view of the regulating apparatus shown in Fig. 1, the view showing the cover and certain other parts broken away.

The single unitary construction for regulating the generator voltage and current in accordance with the present invention is assembled upon a magnetic yoke formed from a single piece of magnetic material into a general U-shaped construction as shown in Fig. 5. A base portion 50 of this yoke is provided with openings 51 which receive reduced diameter lower ends of cores 52 and 53 (see Fig. 4) of two electromagnets. These electromagnets consist of a voltage magnet having a large number of turns of comparatively small size wire 54 wound around core 52, and a current magnet having fewer turns of larger size wire 55 wound around core 53. The core 52 of the voltage magnet terminates in an enlarged upper end or pole piece 56, and a similar pole piece 57 is provided at the upper end of core 53 of the current magnet. The voltage and current electromagnets are so arranged that the current normally flowing in windings 54 and 55 produces like poles at pole piece 56 and 57.

Referring to the magnetic yoke construction shown in Fig. 5, it will be seen that a solid upstanding back portion 60 is disposed substantially at right angles to the base portion 50, and the upper end of portion 60 is bifurcated at 61 to provide armature supporting brackets 62 and 63 which are formed to extend rearwardly substantially parallel with base portion 50. An armature 65 coacting with pole piece 56 of the voltage responsive electromagnet is movably mounted on supporting bracket 62 by a resilient strip 66. The rearward end of strip 66 is securely attached to bracket 62 by screws 67 which pass through openings in a retaining strip 68, through openings in strip 66, through openings in a spacing strip 69 and are threaded into tapped openings in bracket 62. A bifurcated spring member 70 is secured on the upper surface of armature 65 by rivets 71 and a spacing strip 72, the rivets 71 also serving to attach the resilient strip 66 to armature 65. In order to provide the desired operating characteristics of armature 65, magnetic leakage strips 73 are provided beneath the armature to connect pole piece 56 and side member 60.

An armature 75 coacting with pole piece 57 of the current responsive electromagnet is mounted in a very similar manner by a resilient strip 76 on supporting bracket 63. The rearward end of strip 76 is retained by screw 77 passing through openings in a continuation of the retaining strip 68, through holes in the resilient strip 76, through holes in a spacing strip 78 and are threaded into tapped openings in bracket 63. A slotted and bifurcated spring member 80 is mounted on the upper surface of armature 75 by rivets 81 and a spacing strip 82, the rivets 81 also serving to mount the resilient strip 76 on the lower side of armature 75.

One arm 84 of bifurcated spring member 70 is slightly tapered to form a returning spring for armature 65 by engaging the curved end portion of a bendable member 85 which extends upwardly from an upstanding portion 86 of the magnetic yoke. An arm 88 of the bifurcated spring member 80 likewise forms a returning spring for armature 75 by engaging a similar curved end portion of a member 89 which extends upwardly from front portion 86 of the yoke.

A contact arm 90 is formed by the other portion of bifurcated member 70, and a low resistance contact 91 is mounted at the forward end of this contact arm 90. Contact 91 normally engages the lower end of a contact screw 92 having a threaded portion received in a tapped opening in a stationary contact bracket 93, and a lock nut 94 is provided to retain the desired vertical adjustment of contact screw 92 with relation to bracket 93. A slotted contact arm 95 is provided by the other portion of bifurcated strip 80, and a contact 96 is mounted near the front end of arm 95 to normally engage the lower end of a contact screw 97 having a threaded portion received in a tapped opening in a stationary contact bracket 98 with a lock nut 99 provided to retain the adjusted position of contact screw 97.

The stationary contact brackets 93 and 98 terminate in enlarged rectangular lower ends which are mounted in electrically insulated relation on front portion 86 of the magnetic yoke. A single insulating strip 100 is provided to separate the lower ends of brackets 93 and 98 from the front portion 86 of the yoke, and screws 101 pass through openings in brackets 93 and 98 and through insulating strips 100 as well as front portion 86 of the yoke to securely clamp the contact brackets in their illustrated position. Screws 101 are shown as having enlarged heads separated from the brackets 93 and 98 by insulating washers 102, and suitable insulating bushings may be provided to electrically insulate the stem portions of the screws 101 from brackets 93 and 98. In order to prevent displacement of brackets 93 and 98 about the screws 101, dowel pins 103 may be provided in holes in the brackets to extend part way into insulating strip 100.

The magnetic yoke and all the parts thus mounted thereon is secured as a unit on base 20 by the elongated ends of cores 52 and 53 of the voltage and current responsive electromagnets, the elongated end of these cores passing through openings in insulating plates 28 and 29, and base 20 is provided with enlarged openings, the walls of which are spaced from the end portions of cores 52 and 53, to avoid electrical contact therewith. The end portion of the extensions of cores 52 and 53 are threaded to receive nuts 106 whereby the assembly is securely locked upon the base 20.

It will be clear that a downward movement of armature 65 will move contact arm 90 downwardly to disengage contact 91 from contact 92, and in the present apparatus, means are also provided for disengaging contact 96 from contact 97 by this downward movement of armature 65. For this purpose, an arm 110 is provided on armature 65, the arm extending forwardly and slightly upwardly with an offset portion overlying the forwardly extending portion of contact arm 95. This arrangement permits contact arm 95 only to be operated by movement of armature 75, but causes both contact arms 95 and 90 to be operated by movement of armature 65. The advantages of this particular contact operation, and its advantages particularly in combination with the unitary current and voltage responsive structure of the present invention will later be fully described in detail.

In order to facilitate the connection of external wires to the regulating apparatus, suitable terminal strips 112, 113 and 114 are mounted on base 20 with extending portions provided with suitable tapped openings to receive terminal screws. Referring to Fig. 4, it may be seen that the inner end of terminal strip 112 is mounted at the lower end of core 26 of the reverse-current relay electromagnet beneath nut 30, and accordingly this terminal strip 112 is electrically connected through yoke 27 and armature 31 to contact 39 of the reverse-current relay. This terminal 112 may be connected by an external conductor to the storage battery on the vehicle. The terminal strip 113 is mounted on base 20 but electrically insulated therefrom by a screw 116 and nut 117, the stem of the screw passing through an enlarged hole in the base 20 and through holes in insulating strips 28 and 29. The head of screw 116 is electrically connected to the stationary contact bracket 98 by an offset extension 118 as shown in Fig. 1, and one end of the windings 54 and 55 of the voltage and current electromagnets may be electrically connected to the head of screw 116. The extending end of terminal strip 113 may be connected by an external conductor to the generator armature.

Figure 3:
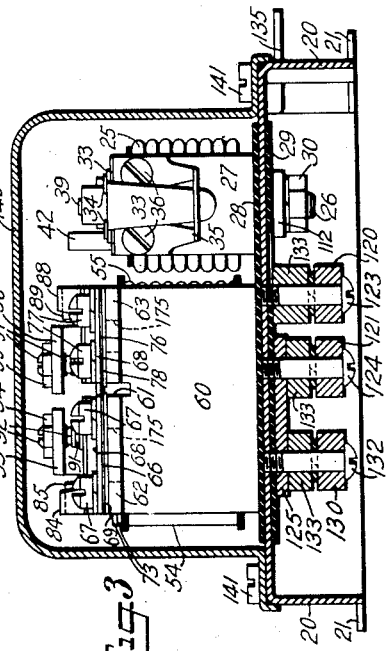
Fig. 3 is a sectional view taken substantially on line 3—3 of Fig. 2.

Two resistance units 120 and 121 which are shown as the carbon type are connected by screws 122 to the T-shaped inner end of terminal strip 113. The other end of resistance unit 120 is connected by screw 123 to ground or the metal base 20, and the other end of resistance unit 121 is connected by a screw 124 to an L-shaped plate 125 which is electrically connected to the armature contact arms 90 and 95 through core 52, yoke 50—60 and armature 65, the strip 125 being retained beneath the nut 106 threaded on the extension of core 52. The third terminal strip 114 is mounted on the base 20 by a screw 127 and nut 128, the screw 127 being electrically insulated from base 20 the same as screw 116 and being electrically connected by an offset lug 128 to the stationary contact bracket 92. A third resistance unit 130 is connected at one end by a screw 131 to terminal strip 114, and the other end of resistance 130 is connected by a screw 132 to plate 125. Each end of the resistance units 120, 121 and 130 may be spaced below the parts to which they are connected by spacing collars 133 as shown in Figs. 3 and 4. The extending end of terminal strip 114 may be connected by an external conductor to the generator field. A ground terminal 135 is provided by an integral offset lug formed from the flange around the edge of base 20.

The ends of terminal strips, 112, 113 and 114 extend through enlarged openings in the front flange of base 20 as shown in Fig. 1, and the ends of these terminal strips are electrically insulated from the edge portion of base 20 by extensions 137 of the insulating plate 28. In order to retain the edges of the terminal strips against contact with the edges of the openings in base 20, an insulating strip 138 is secured by rivets 139 to the front flange of base 20 with notches cut in the upper edge thereof to receive terminal strips 112, 113 and 114. The apparatus mounted above the base member 20 may be enclosed by a suitable cover 140 shown in Figs. 2 and 3 which may have a flanged lower edge resting upon base member 20 and retained in place by screws 161.

The operation of the present regulating apparatus and the advantages of the various features of construction will be described in connection with the wiring diagrams shown in Figs. 6, 7 and 8. In these figures, certain parts of the apparatus are shown in a diagrammatic manner, and wherever possible, like reference numerals have been used to refer to the same parts throughout all the views. It will also be noted that the positive or (+) terminal of the generator and battery are shown as connected to ground which may be the frame of the vehicle, but it is of course clear that the negative or (—) terminal of the battery and generator could be connected to ground or the frame of the vehicle rather than the (+) terminal, or neither of these terminals could be connected to ground and separate insulated conductors could be used.

In the system shown in Figs. 6, 7 and 8, the generator is shown as provided to charge a storage battery 145, and when the generator is at rest or is driven below a predetermined speed, the battery is disconnected from the generator at the open contacts 39—40 of the reverse-current relay. Referring to Fig. 6, it will be noted that one end of the shunt field 11 of the generator is connected to the lower or (+) terminal of the generator armature 10 while the other end of these windings is connected by wire 150, resistance 130, wire 151, resistance 121, and wires 152 and 153 to the upper or (—) terminal of armature 10. However, at low speeds of the generator wherein the output current and voltage do not exceed predetermined values, the resistances 121 and 130 are not effective to limit the current in the shunt field 11 by reason of a shunt circuit completed around resistance 130 through armature 75, contact arm 95, contacts 96—97 and bracket 98, and by reason of a similar shunt circuit completed around resistance 21 through armature 65, arm 90, contacts 91—92 and bracket 93.

Under these conditions, full voltage of armature is applied to shunt field 11, and the armature current of the generator flows from the lower terminal through the ground circuit, upwardly through lower windings 154 of the reverse-current relay, downwardly through the reversely arranged windings 25 of the same relay, wire 155, through windings 55, and wire 156 to the upper terminal of armature 10. This relative direction of current through windings 154 and 25 produces a cumulative magnetic flux which attracts armature 31 to engage contacts 39 and 40. The closing of contacts 39—40 allows battery charging current to flow from the generator armature through the ground circuit, through battery 145, and from the battery by wire 157, armature 31, contacts 39—40, downwardly through windings 25 and back to the upper terminal of armature 10 over the circuit previously traced. The battery charging current then flows through windings 25 in the same direction with contacts 39—40 closed as in the previously traced circuit with these contacts open, and accordingly armature 31 is retained in its attracted position.

The windings 54 of the voltage responsive electromagnet is connected across the output terminals of generator armature 10, or that is the lower end of this winding is connected to ground while the upper end is connected by wires 158, 159 and 153 to the upper terminal of the generator. Thus the current in windings 54 is proportional to the output voltage of the generator, and when the speed of the generator is increased to a point where this voltage exceeds a predetermined value, the current in the windings 54 provides sufficient magnetic force to attract armature 65 against the force of its spring 84.

The attraction of armature 65 not only opens contacts 91—92, but by reason of extension 110, it also opens contacts 96—97. This opens the shunt circuit around both the resistances 130 and 121 so that these resistances are in series in the energizing circuit of the shunt field 11 when the voltage of the generator becomes excessive and the current flowing through the field windings is thereby reduced to a value which is effective to in turn reduce the voltage of the generator below the safe working value for the various parts of the electrical system. This reduced voltage of the generator then reduces the current in windings 54 to an extent which releases armature 65 and again allows contacts 91—92 and 96—97 to close, and if the generator is still being operated at a sufficiently high rate of speed to cause the output voltage to be excessive, it will be clear that armature 65 will again be attracted to open the shunt circuit around resistances 121 and 130. This cycle of operation of armature 65 will be repeated as long as the speed of the generator is sufficiently high to tend to produce an excess voltage, and the rate at which this cycle is repeated will increase as the tendency for the voltage of the generator to increase becomes greater to thereby maintain a substantially constant output voltage of the generator.

The change in current in the generator field 11 caused by the opening of contacts 91—92 and 96—97 is sufficient to produce a considerable induced electromotive force, and this energy stored in the field is dissipated through resistance 120. One end of resistance 120 is connected to one end of field winding 11 through the ground circuit and the other end is connected to the other end of the field through wires 159 and 152, resistance 121, wire 151, resistance 130 and wire 150. In this manner, the resistance 120 is effective to dissipate the energy stored in field 11 in combination with resistances 121 and 130 and yet the normal current flowing through resistance 120 from the armature of the generator does not pass through contacts 91—92 and 96—97, and accordingly this arrangement of resistance 120 does not increase the load which must be carried by these contacts.

In the usual form of regulating systems, the total resistance inserted into the field circuit at high generator speeds is shunted by two sets of contacts arranged in series, one set being operated by a voltage relay and the other by a separate current relay. This total resistance must be of a considerable value in order to sufficiently reduce the generator voltage, and as the shunt circuit around all of the resistances is opened by either of these sets of contacts in the usual arrangement, the heating or arcing from this heavy load on the set of contacts which opens is sufficient to seriously damage the contact surfaces, and on repeated operation it has been found that contacts arranged in this manner will stick or weld together and cause serious damage to the electrical equipment. In the present system however, two separate resistances 121 and 130 are provided to limit the field current with a separate set of contacts for individually shunting each of these resistances. Thus, only a portion 121 of the total field resistance is controlled by contacts 91—92 and the remaining portion 130 of this total resistance is controlled by contacts 96—97, and due to extension 110, both of these sets of contacts are opened by armature 65 when the voltage of the generator becomes excessive. In this manner the total resistance is inserted in the field circuit with the load divided or apportioned between the two sets of contacts.

In the form of the apparatus shown in the accompanying drawings, the extension 110 of armature 65 is arranged so that it may be bent with a suitable tool for purposes of adjustment of the relative operation between the two sets of contacts operated by armature 65. In this arrangement, extension 110 may be adjusted so that both sets of contacts are operated simultaneously by armature 65, or it may be adjusted so that one set of contacts is operated slightly in advance of the operation of the other set.

Referring again to Fig. 6, it will be clear that the battery 145 may become discharged to such an extent that the charging current supplied by the generator will become excessive without allowing the output voltage of the generator to reach a value which causes armature 65 to be attracted. In this instance, the excessive current flowing through windings 55 causes armature 75 to be attracted thereby opening contacts 96—97 to remove the shunt around resistance 130 and thereby cause a reduction in the field current. In most instances, it has been found that the charging current of the battery will be reduced sufficiently to prevent damage by inserting only the resistance 130 in the field circuit, and accordingly armature 75 is arranged to operate only contacts 96—97. However, if desired, it will be clear that an extension could be provided on armature 75 which would overlie contact arm 90 and thereby open contacts 91—92 as well as contacts 96—97 to insert both of resistances 121 and 130 into the field circuit by operation of armature 75.

Figure 6:
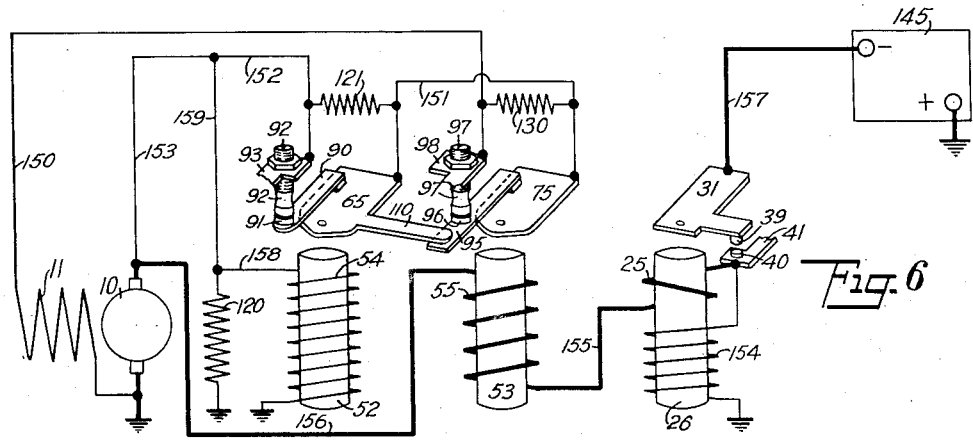
Figs. 6, 7 and 8 are diagrammatic views showing examples of different circuits for connecting the apparatus of the present invention in a regulating system for a generator employed to charge a storage battery.
Figure 7:
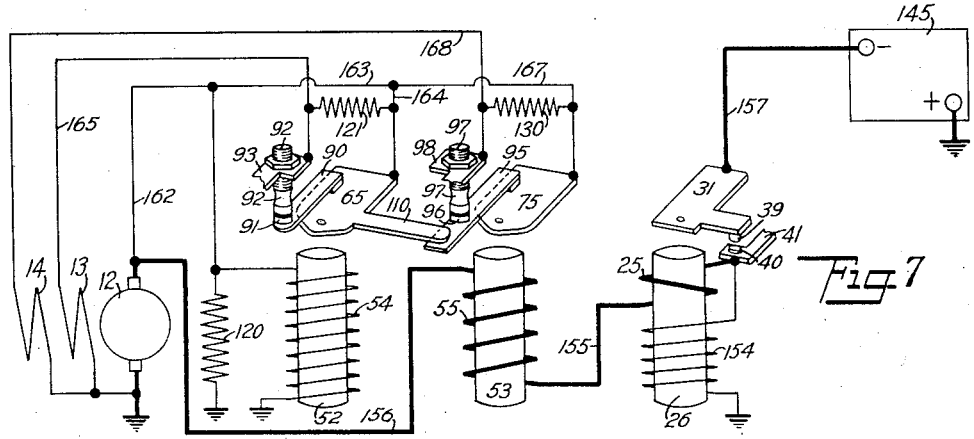

The wiring diagram shown in Fig. 7 is very similar to that shown in Fig. 6 except that the regulating apparatus of the present invention has been applied to a generator having two parallel field windings. The circuit for the windings of the voltage and current responsive electromagnets and the reverse-current relay are the same as in Fig. 6, but in Fig. 7 resistance 121 is connected in series with one of the field windings 13 by wires 162, 163, 164 and 165, and resistance 130 is connected in series with the other field windings 14 by wires 162, 163, 167 and 168. When contacts 91—92 are closed, a shunt circuit is completed around resistance 121 and when contacts 96—97 are closed a shunt circuit is completed around resistance 130 the same as in Fig. 6.

When the generator voltage becomes excessive in the system shown in Fig. 7, it will be clear that contacts 91—92 and 96—97 are open to insert resistance 121 into the energizing circuit for field windings 13 and to insert resistance 130 into the energizing circuit for field windings 14. The values of resistances 121 and 130 are sufficient to reduce the generator field to an extent which prevents an excess voltage being generated. When the output current of the generator becomes excessive without generating an excess voltage, it will be clear that the current in windings 14 only is reduced by the opening of contacts 96—97, and it has been found that it is ordinarily sufficient to merely reduce the current in one of the field windings under these conditions.

Figure 8:
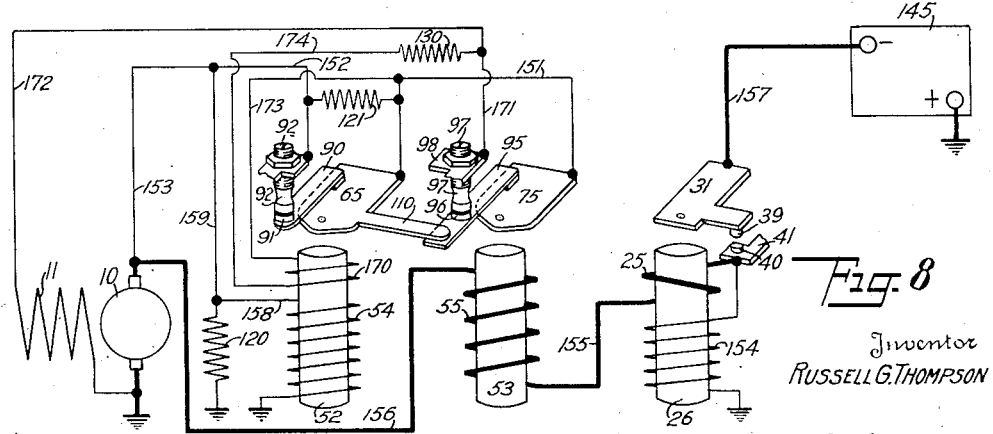

In Fig. 8, the voltage and current responsive electromagnets and the reverse-current relay are connected in circuits the same as in Figs. 6 and 7, but in Fig. 8 additional windings 170 is provided on the voltage responsive electromagnet. The additional windings 170 is connected in series with resistance 130 but when contacts 96—97 are closed a shunt circuit is completed around both windings 170 and resistance 130 so that the energizing circuit for field windings 11 is over wires 153, 152 resistance 121 shunted by contacts 91—92, wire 151, armature 75, arm 95, contacts 96—97, wires 171 and 172. However, when contacts 96—97 open the field circuit includes resistance 130 and windings 170, this circuit including wires 153 and 152, resistance 121 shunted by contact 92—93, wire 173, windings 170, wire 174, resistance 130 and wire 172. The windings 170 are so arranged on the voltage responsive electromagnet that the current flowing therethrough when contacts 96—97 open produces a magnetic flux which adds to the magnetic flux produced by the current flowing in windings 54. In this manner, the opening of contacts 96—97 will increase the magnetic attraction on armature 65 without a change in the generator voltage.

The additional magnetic attraction on armature 65 after contacts 96—97 open provides increased assurance that armature 65 will operate after the output current of the generator has become excessive, and in order to provide more positive operation of both sets of contacts 91—92 and 96—97 by armature 65, armature extension 110 may be bent so that the initial movement of armature 65 causes contacts 96—97 to open before contacts 91—92 are opened by the subsequent movement of the armature. In this manner, an excess generator voltage will operate on armature 65 to open contacts 96—97 during the initial movement of the armature, and after these contacts have opened, the current flowing in windings 170 provides additional pull on armature 65 to provide greater assurance that contacts 91—92 will be opened.

In each of the systems shown in Figs. 6, 7 and 8, it will be clear that the generator field excitation is regulated by the operation of two sets of contacts individually controlling the shunt circuits around two resistances, and these two sets of contacts are operated independently or in combination by the apparatus of the present invention to obtain effective regulation of the generator voltage and current. In this manner, the contact load in controlling the field current is distributed or apportioned between these two sets of contacts so that the arcing and heating of each set of contacts is reduced to a point which greatly increases the effective life of the contact surfaces. In the present regulating apparatus, this operation of the two sets of contacts is effected by a single unit including a single integral magnetic yoke carrying a voltage-responsive electromagnet as well as a current-responsive electromagnet with individually operable armatures coacting with these electromagnets.

The advantages of this single unit construction may be more fully described with reference to Fig. 5. In order that the armatures 65 and 75 may be made to respond to critical values of voltage and current, it is necessary to accurately adjust the air gap or the normal position of the armature with respect to the end of the associated electromagnet. This air gap may be adjusted in the present structure by bending the bifurcated portions 62 and 63 relative to rear portion 60 of the magnetic yoke, and in order to afford convenient adjustment in this manner, slots or openings 175 are cut near the bend forming the connection between brackets 62 and 63 and the rear portion 60 of the yoke. The slot 61 separating bracket 62 from bracket 63 permits individual bending of these brackets for adjustment, and the slots 175 reduce the cross section area near their connection with yoke portion 60 so that the bending of the brackets is facilitated and is localized at this reduced cross section area.

It is also necessary to adjust the tension of spring arms 84 and 86 in order to provide proper response of armatures 65 and 75 to critical values of voltage and current. This adjustment may be conveniently made by bending upstanding portions 88 and 89 of front portion 56 of the magnetic yoke. The relative opening of the two sets of contacts 91—92 and 96—97 by operation of armature 65 may also be adjusted by bending armature extension 110 as previously pointed out. In each case it will be clear that the adjustment is made by bending an individual member particularly designed for this purpose, and when this adjustment is made it cannot be changed by jars or vibration to which the apparatus is ordinarily subjected. It will also be clear that each bendable portion is an integral part of a rigid member so that the adjustment of one of these bendable portions in no way affects the adjustment of the other bendable portions.

Another feature of the unitary construction of the present regulating apparatus is the increased rigidity which prevents displacement of any one part with relation to the others so that the critical adjustment of the various parts with relation to each other may be maintained irrespective of adverse conditions to which the apparatus may be subjected. It will also be clear that when cover 100 is removed, all of the vital parts are accessible and are in convenient position for inspection and adjustment.

The present regulating mechanism is also formed by a minimum number of parts, all of which may be easily and inexpensively manufactured. The number of parts which are electrically insulated has also been reduced to a minimum. In other words, the two armatures 65 and 75 are electrically interconnected and are at the same potential so that no insulation is required between these two relatively moving parts as in the usual system, thereby providing a more rigid and less complicated mechanical arrangement for mounting these armatures.

It is to be understood that various changes may be made in the specific construction shown, and certain features thereof may be employed without others, without departing from the present invention as it is defined in the accompanying claims.

The invention claimed is:

1. In a regulating system, the combination of a magnetic yoke comprising a base portion and upstanding side portions, a plurality of electromagnets each having a core connected to the base portion of said yoke, a plurality of individually bendable portions on one of the upstanding side portions of said yoke, an armature movably mounted on each of said bendable portions to coact with an associated one of said cores, a plurality of individually bendable projections on the other of the upstanding side portions of said yoke, spring means acting between each of said armatures and the associated one of said bendable projections, a contact arm secured to each of said armatures, and a bendable extension on one of said armatures for operating the contact arm secured to another of said armatures.

2. In a regulating system, the combination of a magnetic yoke comprising a base portion and upstanding side portions, a plurality of electromagnets each having a core connected to the base portion of said yoke, a plurality of individually bendable portions on one of the upstanding side portions of said yoke, an armature movably mounted on each of said bendable portions to coact with an associated one of said cores, a plurality of individually bendable projections on the other of the upstanding side portions of said yoke, and spring means acting between each of said armatures and the associated one of said bendable projections.

3. In a generator regulating system, the combination of two electromagnets arranged in spaced parallel relation, a magnetic yoke having a single base portion interconnecting like poles of said two electromagnets and an integral side portion disposed at substantially right angles to said base portion, spaced armature supporting brackets formed by a bifurcated outwardly bent end portion of the side portion of said yoke, an armature coacting with each of said electromagnets, a resilient strip connecting each of said armatures with one of said supporting brackets, and means affording individual adjustment of the operation of said armatures by bending each of said supporting brackets relative to the side portion of said yoke, said means comprising connecting portions between the brackets and the side portion having a reduced cross section.

RUSSELL G. THOMPSON.